Nov. 7, 1933. T. S. VIEROW 1,934,391
MACHINE FOR EXTRUDING SHAPED PIECES
Filed Nov. 30, 1931 2 Sheets-Sheet 1
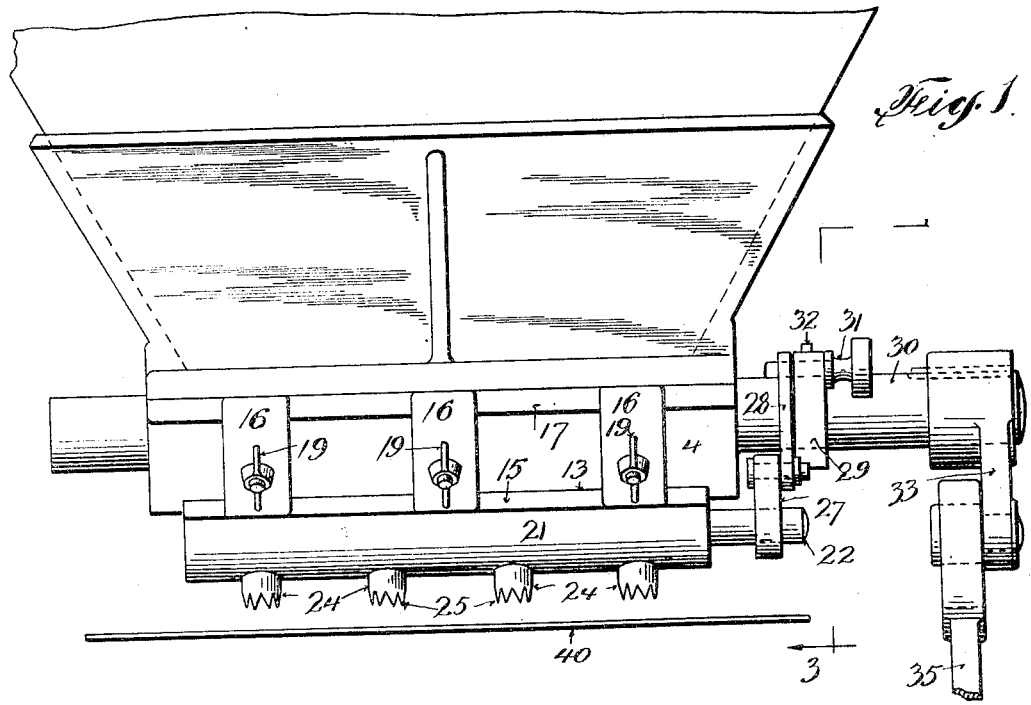
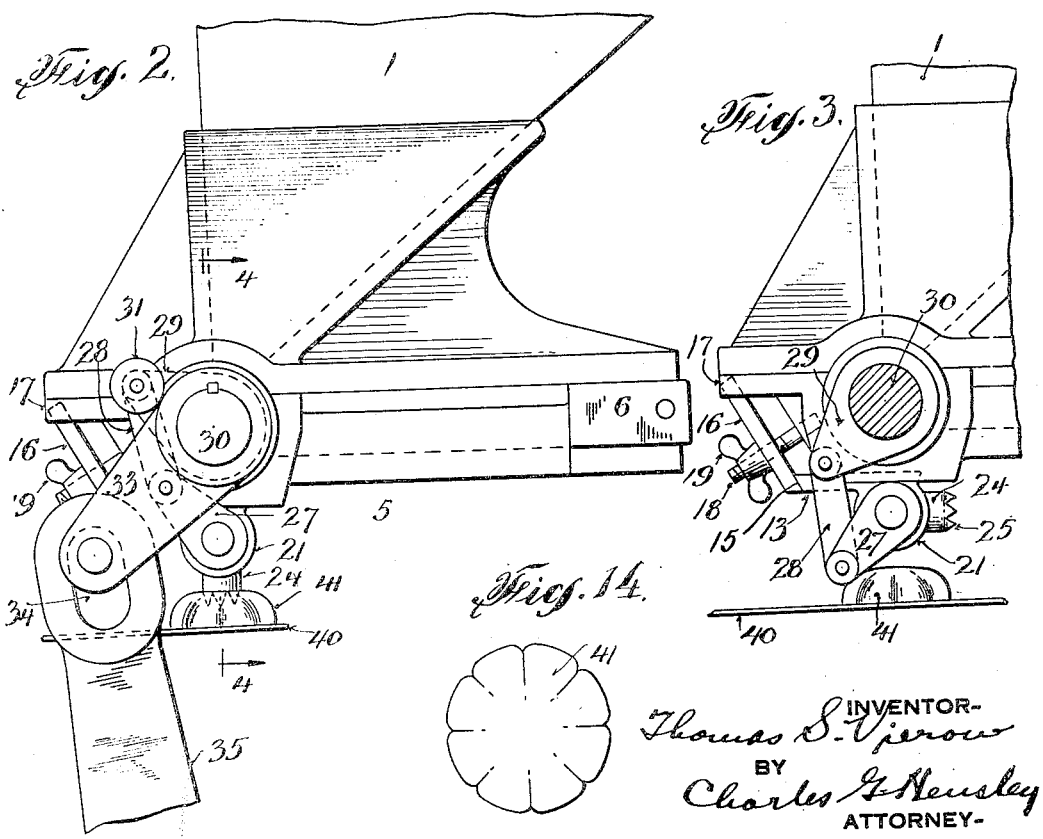
INVENTOR-
Thomas S. Vierow
BY
Charles G. Hensley
ATTORNEY-

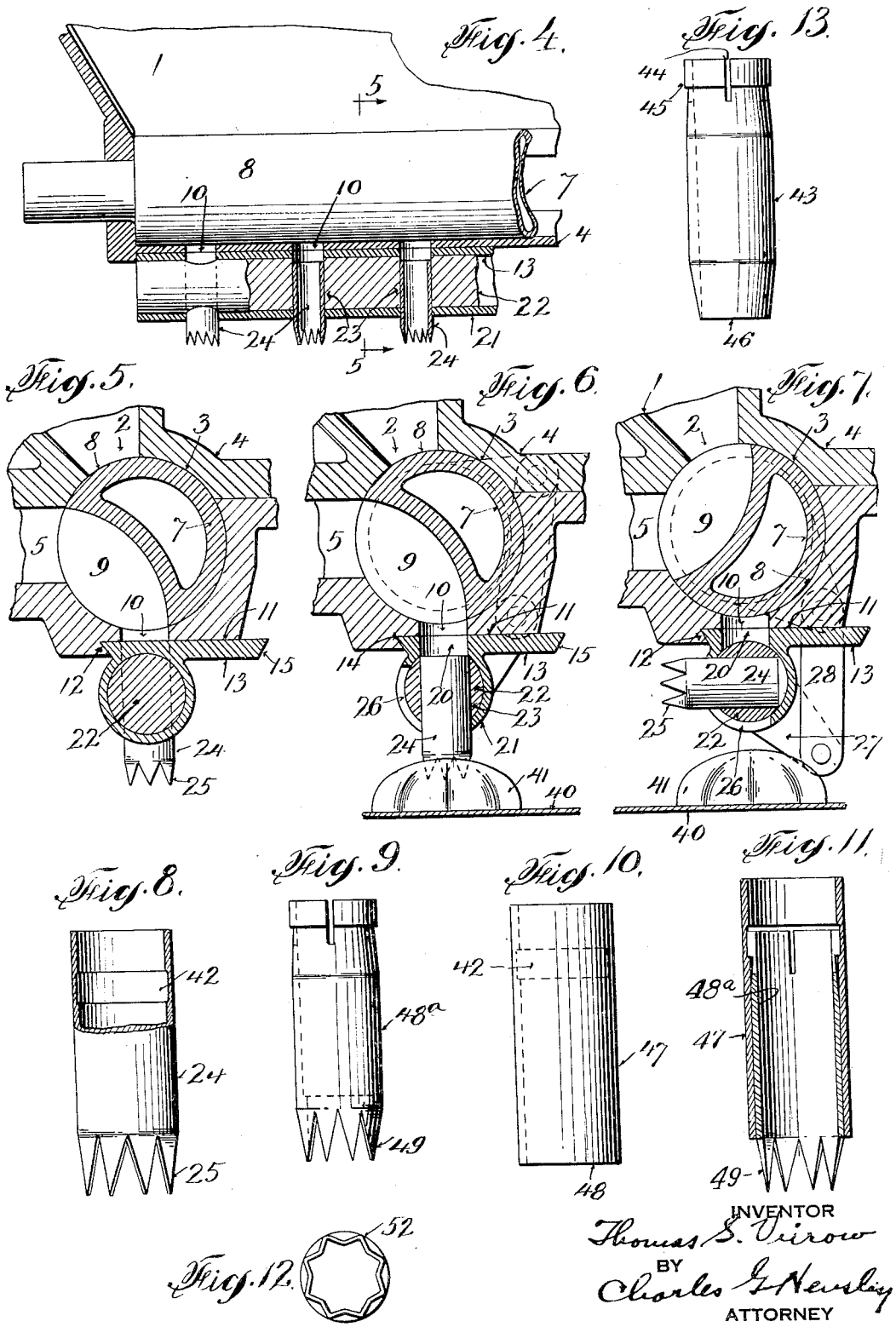

Patented Nov. 7, 1933

1,934,391

UNITED STATES PATENT OFFICE 1,934,391

MACHINE FOR EXTRUDING SHAPED PIECES

Thomas S. Vierow, Jersey City, N. J.

Application November 30, 1931
Serial No. 578,044

7 Claims. (Cl. 107—28)

It is common practice to extrude material, more or less in a plastic state, through a nozzle or discharge member by means of a bag in which a supply of material is held, the operator squeezing the bag from time to time to extrude the material through the nozzle and to deposit it upon a support. This practice is followed in making and depositing shapes for candy, chocolates and for various articles of confection, as well as for articles which are to be baked or cooked in fancy shapes.

The object of my invention is to make it possible to extrude from a machine operating automatically or driven by power, one or any other number of charges which may be deposited simultaneously on a support and to have these charges take various shapes, according to the desired design of the finished article. The present machine may be used for extruding material to be made into candies, confections and baked goods, and the design of the extruded material may be varied by selecting nozzles of different shapes.

The machine includes a suitable hopper for containing a supply of material in plastic form, together with a plunger for drawing the material from the hopper into a measuring cylinder, and this plunger is adapted to discharge the material from the cylinder in measured quantities. An oscillating valve controls the withdrawal of the material from the hopper into the cylinder and its discharge from the cylinder into the discharge nozzles.

The machine may contain one or any greater number of discharge nozzles depending on the number of pieces which are to be extruded at each operation. In the drawings I have shown a machine provided with four such nozzles but it will be readily understood that there may be a greater or lesser number, as desired.

The nozzles are mounted to oscillate in order to remove them from the discharged material and in order to cut off the material between the ends of the nozzles and the deposited pieces, as well as to cut off the flow of the material into and through the nozzles. The nozzles are oscillated automatically and in timed relation with the plunger action of the machine, so that there is no pressure tending to force the material into the nozzles at the time they are rocked to discontinue the discharge operation. Other features and advantages will be set forth in the following detailed description my invention.

In the drawings forming part of this aplication,

Figure 1 is an end view of a portion of an extruding machine having my invention applied thereto, Figure 2 is an end view thereof, Figure 3 is a sectional view taken on the line 3—3 of Figure 1, Figure 4 is a sectional view taken on the line 4—4 of Figure 2, Figure 5 is a sectional view taken on the line 5—5 of Figure 4, Figure 6 is a sectional view taken on the line 6—6 of Figure 4, Figure 7 is a similar view showing the parts in a still different position, Figure 8 is an elevation, partly broken away, and showing one type of nozzle which may be used in the machine, Figure 9 is an elevation of an inner sleeve adapted to be inserted into the outer members shown in Figure 10, Figure 10 is an elevation of a slightly modified form of nozzle, Figure 11 is a vertical, sectional view showing the discharge nozzle composed of the members shown in Figures 9 and 10, Figure 12 is an end view of a form of nozzle adapted to discharge fluted pieces, and Figure 13 is an elevation of an inner member which may be inserted into the device shown in Figure 8.

Figure 14 is a plan view of a piece deposited by the type of nozzle shown in Figures 1 to 3.

The present invention may be embodied in a machine of the type shown in my Letters Patent No. 1,826,230, which latter shows and describes a type of extruding machine wherein the dough is taken from a hopper by the suction action of a piston, the dough being drawn into a cylinder for measuring and on the reverse motion of the plunger it is forced out through a die and deposited in individual pieces. The present machine may, and preferably does incorporate the hopper, plunger and cylinder, but instead of the usual die I provide the oscillating nozzles which form the main feature of my present invention.

It will be understood that the present invention may be incorporated in a machine like that shown in my patent, or in any other type of extruding machine, and for convenience I will describe it as incorporated in a machine like said patent.

In the drawings I have shown a hopper 1 adapted to receive a quantity of material for depositing and this may be in stiff or plastic condition, or a thin condition more or less liquid in character, according to the articles to be made from it. As far as the present machine is concerned, it will handle the material in various conditions. Along the bottom or outlet end of this hopper there is a discharge opening 2 which communicates with a cylindrical opening 3 formed in the casting or head 4 at the bottom of the hopper and which cylindrical opening forms the chamber within which an oscillating valve operates.

Extending horizontally from the cylindrical chamber 3 is the cylinder 5, the bore of which communicates with the chamber 3. There is a plunger 6 reciprocating in this cylinder and it is connected with operating mechanism which reciprocates the piston in timed relation with the operation of the valve. As far as my present invention is concerned, the piston may be connected with the same operating mechanism as is shown in my said patent.

Within the cylindrical chamber 3 there is arranged a valve body 7 having a periphery 8 which corresponds with the surface of the cylindrical chamber 3; and this valve body is adapted to be oscillated about its own axis within this chamber for the purpose of controlling the action of the material received from the hopper. The valve is shown as having an arcuate cut-out or recess 9 on one side, the proportion of which will permit the control of the material in the manner hereinafter described.

The head 4 is provided with a number of discharge apertures 10 disposed at intervals, according to the number of nozzles which are to deposit the material.

In the drawings I have shown four nozzles and therefore there will be four discharge openings 10 in the head, although it is to be understood that there may be one or any greater number of nozzles and a corresponding number of discharge openings. The head is provided with a cut-out or recess 11 on its under side below the oscillating valve, one side of which has a dovetail or undercut portion 12 with which the nozzle plate 13 has a locking engagement along its dovetail edge 14 so that one side of the nozzle plate will be supported by this dovetail connection.

The opposite side of the nozzle plate is chamfered, as shown at 15 in Figure 3, and this is engaged by several locking plates 16 each engaging against the chamfered surface 15 of the nozzle plate, and against a stationary portion 17 of the head of the machine. These clamps are secured by bolts 18 threaded into the head of the machine and secured in place by the wing nuts 19 the bolts passing through the clamping plates 16 and holding them pressed against the nozzle plates 13 to secure the latter in place within the socket 11 of the head. This nozzle plate is provided with an aperture 20 for each nozzle, and these register with the several apertures 10 in the head.

Depending from the nozzle plate 13 is a cylindrical member 21 having a cylindrical chamber in which there is fitted a nozzle carrying member 22 the exterior of which is cylindrical to conform with the cylindrical bore of the member 21. This cylindrical member 22 extends the full length of the head 4 and at intervals it is provided with transverse bores 23 adapted to receive the extruding nozzles. In Figures 5 to 7 I have shown nozzles 24 consisting of cylindrical members having serrated members 25 on the lower or discharge ends of the nozzles.

These nozzles are fitted into the bores 23 of the oscillating member 22 and are preferably slightly tapered so that when driven into the bores 23 they will grip the same with sufficient force to remain in place during the extruding operations. At the bottom and extending upwardly at one side of the cylindrical housing 21 there are slots 26 formed in the wall of this member, one for each extruding nozzle, and therefore there are four of these slots in the construction shown in the drawings. These slots are to permit the nozzles to oscillate from a vertical position, as shown in Figure 5, to a horizontal position, shown in Figure 7.

When the oscillating member 22 is in the position shown in Figure 6, the nozzles stand in a vertical position and their bores are in communication with both the apertures 20 in the nozzle plate and with the apertures 10 of the head.

The nozzle carrying member 22 is oscillated approximately 90° by the following means: The oscillating member extends through and projects from the housing 21 and on the end which so projects there is secured a rocker arm 27 as shown in Figures 1 to 3 inclusive. There is a pitman 28 pivotally connected with the outer end of this arm and its other end is connected pivotally with an arm 29 which is mounted on and oscillates with the member 30 which is a continuation of the oscillating valve body 7. The connection between the pitman 28 and the arm 29 is preferably made by means of a sliding bolt 31 which is held in place by the pin 32 and the latter may be lifted to shift the bolt 31 to disconnect the pitman 28 from the rocker arm 29 when the nozzle device is to be thrown out of operation. On the end of the member 30 there is another rocker arm 33 which is pivotally connected by a slot and pin connection 34 with a lever arm 35 which serves to rock the member 30 periodically in timed relation with the reciprocation of the plunger and the parts for operating this device may be all constructed as shown in my said patent.

Operation

It may be assumed that a supply of material to be deposited is disposed in the hopper 1. When the machine is set into operation, the parts may be in the position shown in Figure 7. When the parts are in this condition the open side 9 of the oscillating valve 7 will provide a space for the bottom or discharge end of the hopper to communicate through the space 9 in the valve with the bore of the cylinder 5.

At this time the oscillating member 22 is in the position shown in Figure 7, so that all of the extruding nozzles 24 lie in a horizontal position, and the upper portion of the member 22 acts as a valve and prevents any of the material feeding into the circular chamber 21 and therefore into any of the extruding nozzles. While the parts are in this position the piston 6 makes one stroke backwards or away from the valve 7 and in doing so it draws the material from the hopper through the space 9 of the valve 7 and into the cylinder 5. The length of the backward stroke of the piston determines the quantity of material taken into the cylinder.

After the material has been drawn into the cylinder, the piston will reverse its direction of movement and move toward the valve 7 but just before this occurs, or about the same time, the valve body 7 will be turned from the position shown in Figure 7 to the position shown in Figure 6, or about ninety degrees from its first position. The valve will now shut off the flow of material from the bottom of the hopper and the opening of the valve will form a means of communication between the cylinder 5 in which the material has been received and measured, with the discharge aperture 10 in the valve head. At the same time that the valve body 7 is oscillated to the position shown in Figure 6, the pitman 28 and the oscillating arm 27 are operated through the connections above described, so that the oscillating member 22 revolves in the cylindrical housing 21.

The nozzles move from the horizontal position into the vertical position shown in Figure 6, as they are mounted in the member 22, and the several slots 26 allow the nozzles to move from the horizontal to the vertical position, and vice versa. As the nozzles are brought into the vertical position, their bores communicate or register with the openings 20 as well as the openings 10. The plunger 6 now moves in the cylinder toward the valve 7 and forces the material which was taken into the cylinder through the opening 9 of the valve and through the apertures 10, 20 into and through the bores of the several nozzles.

A measured quantity of material will thus be forced through each nozzle and the material passing through a particular nozzle will discharge at the lower open end onto any kind of support 40 which may be a travelling belt, a tray or any other member. The material will, by reason of the forced action of the plunger, be caused to spread out as it leaves the lower ends of the nozzles. If the discharge end of each nozzle is provided with serrations 25, as shown in Figures 5 to 7, the tops of the bodies of material 41 will be provided with ridges or flutings disposed radially of the body, as shown in Figures 6 and 7.

A body of the material will be thus discharged from each independent nozzle, although in a machine having a plurality of nozzles they will all discharge their materials in individual bodies on the support 40 simultaneously. As the cycle of the machine progresses, the parts will be returned to the position shown in Figure 7. During this operation, each nozzle swings from the vertical to the horizontal position, the discharge end of the nozzles moving away from the bodies of material just deposited upon the support.

The distance that the end of the nozzles move from the bodies of deposited material insures complete disengagement of the nozzles from the deposited material. When the nozzles have moved into the horizontal position of Figure 7, the support 40 may be moved to remove the deposited pieces 41 from under the nozzles and to bring different portions of the support into position below the nozzles to receive new deposits.

As the nozzles swing towards the horizontal position, the body 22 in which they are mounted turns in the spherical socket 21 and acts as a valve to close the apertures 20 so that when the nozzles are horizontal, as shown in Figure 7, any material in the apertures 10, 20 or in the opening 9 of the valve above is shut off by the number 22 and cannot pass into the bores of the nozzles.

The valve 7 is also returned to the position shown in Figure 7 while the nozzles are being moved into the horizontal position so that the discharge end of the hopper is again placed into communication with the bore of the cylinder 5 through the opening 9 of the valve body 7. This completes one cycle of operation of the machine and the parts are ready for another charge to be drawn into the cylinder.

It will be apparent from the above that the nozzles are moved or rocked so that at the time the material is extruded, they are in an upright or vertical position, whereas at another time they lie in a non-vertical and preferably horizontal position. It will also be apparent that the member 22 acts as a valve body to cut off the flow of material to each nozzle when the nozzles are in the raised position. The movement of the nozzles between the vertical and horizontal position detaches the discharge ends of the nozzles from the deposited material and allows the support 40 to be shifted to remove the deposited materials and bring a different portion of the support into position to receive subsequent deposits.

The movement of the nozzles from the vertical to the horizontal position definitely removes the nozzles from the deposited material in much the same manner as the nozzle is manipulated in hand operated devices. In the present machine the deposited pieces will be more uniform in size and shape because a definitely measured quantity is discharged through each nozzle at each depositing operation. Also the disengaging motion of each nozzle is the same at each operation so that the deposited pieces are more uniform in quantity, shape and size than in hand operated devices.

In Figures 8 to 13 I have shown different types of nozzles which may be used in the present machine. In Figure 8 I have shown a cylindrical nozzle 24 having the serrated members 25 on the bottom edge to give a fluted effect to the top of the deposited pieces. This cylindrical member is provided with an annular groove 42 on the inner side of the wall of the member so that a sleeve member such as is shown at 43 in Figure 13 may be slid into the member 24.

The upper portion of the member 43 is slotted, as shown at 44 to make this portion slightly resilient or compressible; and there is a shallow flange 45 extending around this portion of the member. When the member 43 is inserted endwise into the member 24 the upper end of the member 43 is slightly compressed, and when the flange 45 registers with the groove 42 the resiliency of the wall of the member 43 forces this flange 45 outwardly into the groove to lock the two parts of the nozzle together.

If the bottom end of the member 24 is provided with serrations 25, when the member 43 is inserted therein the pieces deposited will not be fluted because the lower end 46 of the member 43 has no serrations and the serrations 25 are covered inside and therefore ineffective.

If desired, the exterior nozzle member 47 may have a squared end, as shown at 48 in Figure 10, in which case the pieces will not be fluted. If desired, the lower end of the nozzle may have star-shaped ribs shown at 52 in Figure 12, in which case the deposited pieces will have a shape corresponding with the shape of the nozzle. The lining member 48a shown in Figure 9 may be inserted into the nozzle member 47 as shown in Figure 11. The serrated lower end 49 of the liner projects below the member 47 and will form flutings in the pieces.

It will be seen from this that a set of nozzles may be provided for the member 22 and that different forms of nozzles may be substituted from time to time, according to the shapes to be given to the deposited pieces and that liners may be inserted into and removed from the nozzles to permit variations in the sizes of deposited pieces, as well as their shapes.

Having described my invention, what I claim is:

1. A machine for extruding material into individual pieces, including a hopper for holding a supply of material, a cylinder, a piston for drawing material from said hopper into said cylinder and for ejecting the material from said cylinder, a valve casing communicating with said hopper and said cylinder and having an outlet port, an oscillating valve in said casing adapted to alternately connect and disconnect said cylinder and said hopper and said cylinder and said outlet port, and an oscillating nozzle adapted to receive the material discharged through said outlet port, and to deposit the same upon a support disposed below the nozzle.

2. A machine for extruding material into individual pieces, including a hopper for holding a supply of material, a cylinder, a piston for drawing material from said hopper into said cylinder and for ejecting the material from said cylinder, a valve casing communicating with said hopper and said cylinder and having a stationary outlet port, an oscillating valve in said casing adapted to alternately connect and disconnect said cylinder and said hopper and said cylinder and said outlet port, an oscillating nozzle adapted to receive the material discharged through said outlet port, and to deposit the same upon a support below the nozzle, and means for oscillating said nozzle and said valve in timed relation with each other.

3. A machine for extruding material into individual pieces, including means for holding a supply of material, means for forcibly ejecting material from the supply through a port, a cylindrical housing having a port communicating with said first port the material passing in succession through said ports, an oscillating member in said housing adapted to act as a valve for controlling the delivery of material through said ports, a nozzle mounted in said oscillating member and adapted to receive the material from said ports therethrough to deposit the material upon a support, said nozzle being in receiving relation to said ports in one position of said oscillating member and said oscillating member closing said ports in another position thereof to shut off the flow of material through said nozzle at the receiving end of said nozzle.

4. A machine for extruding material into individual pieces, including means for holding a supply of material, means for forcibly ejecting material from the supply through a port, a housing having a port registering with said first port the material passing in succession through said ports, said housing having a cylindrical chamber, an oscillating member movable in said chamber and having a nozzle therein, and means for oscillating said oscillating member whereby the nozzle will at one time be in vertical position and in communication with both said ports, and at another time said nozzle will be in a non-vertical position with said oscillating member cutting off the discharge of material through said ports at the receiving end of said nozzle.

5. A machine for extruding material into individual pieces, including a hopper for holding a supply of material, a cylinder, a piston for drawing material from said hopper into said cylinder, a valve body having an outlet port, a valve in said valve body adapted to alternately connect and disconnect said cylinder and said hopper and said cylinder and said outlet port, a valve housing having a port communicating with the outlet port of said first valve body, an oscillating valve in said second mentioned valve body, a nozzle in said oscillating valve said oscillating valve arranged to close the flow of material at the inlet end of said nozzle and means for operating said valves in timed relation whereby said nozzle will be in communication with said ports and said first valve will connect said cylinder with said outlet port, and whereby said second valve will be closed while said first valve connects said cylinder with said hopper.

6. A machine for extruding material into individual pieces, including a hopper, a cylinder, a piston for drawing material from said hopper into said cylinder and for ejecting the material therefrom, a valve body having a discharge port, a valve in said valve body adapted to alternately connect said cylinder with said hopper and with said discharge port, a plate detachably connected with said valve body and having a port registering with said discharge port, a cylindrical valve body carried by said plate, an oscillating valve in said latter valve body, a nozzle carried by said oscillating valve and adapted, when in a vertical position, to register with said ports, said oscillating valve being adapted to be turned to shut off the flow of material through said nozzle and to swing the nozzle out of discharge position and means for operating both of said valves.

7. A nozzle for extruding machines, comprising a cylindrical body having an interior annular groove, a lining member for said nozzle comprising a cylindrical body having a split end adapted to be compressed, a flange around the split end of said second mentioned body, said second body being adapted to be slid into said first body so that said flange engages in said groove to hold the second body within the first body.

THOMAS S. VIEROW.